US006952925B2

(12) United States Patent
Hallman et al.

(10) Patent No.: US 6,952,925 B2
(45) Date of Patent: Oct. 11, 2005

(54) OPTIMIZING INLET AIR FOR GAS TURBINES

(75) Inventors: John Henry Hallman, Willis, TX (US); William J. Hyland, Poland, OH (US); Ray Veldman, Bellaire, TX (US); Jeff Diaz, Spring, TX (US); William Larry Lewis, Houston, TX (US)

(73) Assignees: SME Associates, Inc., Houston, TX (US); Clearwater International, LLC, Houston, TX (US)

( * ) Notice: Subject to any disclaimer, the term of this patent is extended or adjusted under 35 U.S.C. 154(b) by 20 days.

(21) Appl. No.: 10/417,394

(22) Filed: Apr. 16, 2003

(65) Prior Publication Data

US 2004/0006966 A1 Jan. 15, 2004

Related U.S. Application Data

(60) Provisional application No. 60/373,413, filed on Apr. 17, 2002.

(51) Int. Cl.$^7$ .................................................. F02C 1/00
(52) U.S. Cl. ........................................ 60/772; 252/70
(58) Field of Search .......................... 60/772, 773, 775, 60/728, 730, 39.093; 137/15.1; 252/67, 70, 71, 76

(56) References Cited

U.S. PATENT DOCUMENTS

| | | |
|---|---|---|
| 3,742,096 A | 6/1973 | Spivack |
| 3,901,715 A | 8/1975 | Callahan et al. |
| 3,950,950 A | 4/1976 | Doerner et al. ............... 60/657 |
| 3,952,051 A | 4/1976 | Ogawa et al. |
| 3,962,874 A | 6/1976 | Doerner ....................... 60/669 |
| 4,105,592 A | 8/1978 | Collins |
| 4,117,794 A | 10/1978 | Sjogren |
| 4,153,473 A | 5/1979 | Resenbert et al. |
| 4,192,760 A | 3/1980 | Junger et al. |
| 4,355,079 A | 10/1982 | Rosenberg et al. |
| 4,372,932 A | 2/1983 | Haas |
| 4,444,672 A | 4/1984 | Gancy |
| 4,537,694 A | 8/1985 | Horodysky |
| 4,581,039 A | 4/1986 | Horodysky |
| 4,849,119 A | 7/1989 | Horodysky |
| 4,954,279 A | 9/1990 | Ma et al. |
| 5,064,551 A | 11/1991 | Smith |
| 5,104,562 A * | 4/1992 | Kardos et al. ................ 252/79 |
| 5,131,233 A | 7/1992 | Cray et al. ....................... 62/64 |
| 5,334,323 A | 8/1994 | Schrimpf et al. |
| 5,380,706 A | 1/1995 | Himes et al. |
| 5,390,505 A | 2/1995 | Smith et al. ................... 62/173 |
| 5,398,497 A | 3/1995 | Suppes ....................... 60/39.05 |
| 5,435,930 A | 7/1995 | Chan et al. |
| 5,555,738 A | 9/1996 | De Vault ................... 62/238.3 |
| 5,635,458 A | 6/1997 | Lee et al. |
| 5,725,637 A | 3/1998 | Gavlin et al. |
| 5,759,436 A | 6/1998 | Schrimpf et al. |
| 5,772,912 A | 6/1998 | Lockyer et al. |
| 5,846,450 A | 12/1998 | Atkinson |
| 5,853,458 A | 12/1998 | Galvin |
| 5,935,488 A | 8/1999 | Weisenfeld et al. |
| 5,993,684 A | 11/1999 | Back et al. |
| 6,058,695 A | 5/2000 | Ranasinghe et al. ..... 60/39.182 |
| 6,059,989 A | 5/2000 | Stankowiak et al. |
| 6,059,996 A * | 5/2000 | Minks et al. ............... 252/395 |
| 6,156,226 A | 12/2000 | Klyosov et al. |
| 6,195,997 B1 | 3/2001 | Lewis et al. .................. 60/648 |
| 6,221,276 B1 | 4/2001 | Sarin |
| 6,239,183 B1 | 5/2001 | Farmer et al. |
| 6,287,480 B1 | 9/2001 | Berglund et al. |
| 6,301,897 B1 | 10/2001 | Uchida ........................ 60/728 |
| 6,321,552 B1 | 11/2001 | Frederiksen ............... 62/238.3 |
| 6,368,384 B1 | 4/2002 | Smith |

(Continued)

FOREIGN PATENT DOCUMENTS

| | | | |
|---|---|---|---|
| DE | 44 31 233 | 3/1995 | |
| DE | 196 04 102 | 7/1997 | |
| FR | 903885 | 10/1945 | ........................ 6/2 |
| GB | 606962 | 8/1948 | |
| GB | 716598 | 10/1954 | |
| GB | 1 585 265 | 2/1981 | |
| SU | 1 786 020 | 1/1993 | |
| WO | WO 95/29371 | 11/1995 | ........... F25B/17/08 |
| WO | WO 96/39472 | 12/1996 | ............ C09K/5/04 |
| WO | WO 97/01612 | 1/1997 | |
| WO | WO 99/37733 | 7/1999 | |
| WO | WO 01/81497 | 11/2001 | ............ C09K/5/10 |
| WO | WO 01/94494 | 12/2001 | ............ C09K/5/00 |
| WO | WO 01/96723 | 12/2001 | ........... F02C/7/143 |
| WO | WO 03/012001 | 2/2003 | |

OTHER PUBLICATIONS

Aittomaki A., et al., Potassium Formate As A Secondary Refrigerant, International Journal of Refrigeration, pp. 276–282, vol. 20, No. 4, Jun. 1997.

PCT International Search Report, International Application No. PCT/GB 03/01643, dated Aug. 25, 2003.

Alco Gas & Oil Production Equipment Ltd., "Designed and Manufactured Products Heaters", Internet Article, retrieved from the internet on Mar. 21, 2003, last modified on Dec. 21, 2000.

XP–002249817, Derwent Publications Ltd., GB; AN 1994–033101, Section Ch, Week 199404 (English translation of the Abstract for foreign patent SU 1786020A1).

*Primary Examiner*—William H. Rodriguez
(74) *Attorney, Agent, or Firm*—Moser, Patterson & Sheridan, L.L.P.

(57) ABSTRACT

Air intake temperature in a gas turbine is regulated by a heat exchange fluid having a low viscosity at low temperatures. The circulated heat transfer fluid preferably comprises an alkali metal formate, most preferably potassium formate. The potassium formate may be blended with other alkali metal formate(s), with alcohol, glycols, salt brines, or any combination of glycols, alcohols, Sodium Nitrite, Sodium Nitrates, Potassium Chloride, Sodium Chloride, water and/ or or other salt brines.

19 Claims, No Drawings

U.S. PATENT DOCUMENTS

| | | | |
|---|---|---|---|
| 6,408,609 B1 * | 6/2002 | Andrepont | 60/772 |
| 6,470,686 B2 | 10/2002 | Pierson | |
| 6,723,254 B1 * | 4/2004 | Starzmann | 252/71 |
| 6,769,258 B2 * | 8/2004 | Pierson | 60/772 |
| 2002/0003223 A1 | 1/2002 | Smith et al. | |
| 2002/0017095 A1 | 2/2002 | Pierson | |
| 2002/0033471 A1 * | 3/2002 | Odle et al. | 252/76 |
| 2003/0034478 A1 | 2/2003 | Stanley et al. | |
| 2003/0209689 A1 * | 11/2003 | Smith et al. | 252/70 |
| 2004/0040336 A1 * | 3/2004 | Dick et al. | 62/434 |
| 2005/0056023 A1 * | 3/2005 | Pierson | 60/772 |

\* cited by examiner

OPTIMIZING INLET AIR FOR GAS TURBINES

RELATED APPLICATION

This application incorporates in full and claims the full benefit of Provisional Patent Application No. 60/373,413 filed Apr. 17, 2002.

TECHNICAL FIELD

This invention pertains the use of particular heat transfer fluids to maintain desired densities and temperatures in combustion air for a gas turbine.

BACKGROUND OF THE INVENTION

It is known to cool or heat the inlet combustion air to gas turbines to obtain a desired enthalpy. An excellent explanation of the relationships of relative humidity, wet and dry bulb temperature, and specific volume of air as they affect enthalpy is provided in Smith, McCloskey and Cates U.S. Pat. No. 5,390,505, which is incorporated herein by reference in its entirety. See particularly the psychrometric chart of FIG. 9.

In addition, the combustion air consumed by a gas turbine may require heating to prevent ice formation as a function of dew point at ambient temperatures below about 43 degrees F. It is also known that, where ambient temperatures are above about 43 degrees F., cooling the combustion air going to a gas turbine will result in increased power output of the gas turbine. Temperature affects air density, and turbine efficiency is in turn affected by the density of the intake air. It is desirable to control the temperature of the heat exchange fluid in the coils of a turbine which contact the incoming air, to achieve greater power output and efficiency and at the same time prevent icing on the outside of a heat exchange coil. Icing on the outside of the coils is quite undesirable, mostly because ice formation can damage the gas turbine if ingested but also because it decreases the heat exchange in the areas affected, and also impedes the flow of air through the intake. The temperature control can be programmed to take into account the factors which affect the desired outcome. As is known in the art, in many cases it may not be necessary to heat the air to a temperature above 32° F.; indeed in many cases (because of the moisture content of the air at the ambient temperature and density) one need only heat the incoming air from −20°, for example, to −10° F., in order to inhibit icing on the outside of the coil.

As illustrated in the above referenced U.S. Pat. No. 5,390,505, the efficiency of the gas turbine may be enhanced by either increasing or decreasing the temperature of the intake air under various circumstances. The air density may vary as a function of the air temperature: "Provision of reduced temperature or increased density air rather than ambient air to a gas turbine-generator generally provides an increase in turbine efficiency and output capacity or generator KW". Column 7, lines 58–61. The improvement in turbine-generator efficiency is illustrated In FIG. 10 of that patent, where water vapor concentration is considered also as a factor in plotting enthalpy.

Fluid heat transfer coils have been successfully used to cool the intake air, using heat exchange fluids such as water, ethylene glycol solution, propylene glycol solution or alcohol brines in direct or indirect contact with the combustion air. But many of the fluids used in the past, such as ethylene glycol or propylene glycol, are hazardous pollutants and have regulatory classifications. Moreover, many cooling fluids conventionally used in gas turbines, such as the glycols, tend to become very viscous as the working temperature is reduced, which is counterproductive to the purpose of improving heat transfer efficiency for lowering the temperature of the air to increase its density. A highly viscous heat exchange fluid will tend to have a low Reynolds Number—that is, its flow will tend to be laminar rather than turbulent, thus decreasing its heat transfer efficiency. And, more energy will be required to pump it. While plain water has good heat transfer efficiency and viscosity characteristics, its freeze point clearly limits its low temperature acceptability.

DeVault, in U.S. Pat. No. 5,555,738, teaches use of an ammonia water refrigeration system to cool the inlet air of a gas turbine for improved efficiency. Lewis et al, in U.S. Pat. No. 6,195,997, disclose an energy recovery system using a refrigeration loop to cool the inlet air for a gas turbine.

Hallman et al SPE paper # 65616 teaches use of aqueous formates to improve thermal performance of line heaters in gas production and transmission systems. See also Smith et al U.S. patent application Ser. No. 09/788,115 filed Feb. 16, 2001.

It would be desirable to control the temperature of the incoming combustion air in a gas turbine to obtain an optimum power output and efficiency, using a fluid having good heat exchange properties and also a low viscosity at low temperatures.

SUMMARY OF THE INVENTION

Our invention includes a method of enhancing the efficiency of a gas turbine having a heat exchanger for intake air, the heat exchanger including a heat exchange fluid, comprising (a) determining a desired air temperature range for the intake air, and (b) using as the heat exchange medium a fluid, preferably an aqueous alkali metal formate (more preferably sodium or potassium formate or a mixture thereof) solution, having a concentration and viscosity within ranges known to provide a desired heat exchange rate to achieve at least one temperature within the desired air temperature range in the heat exchanger. More preferably the heat exchange fluid will comprise an aqueous solution of potassium formate. Preferably also the solution will be chosen for its heat exchange efficiency, its freezing point, and its heat capacity—that is, the benefits of a viscosity within the desired range and the benefits of heat exchange efficiency and heat capacity for a range of concentrations of alkali metal formate, with or without other constituents in the solution, will be balanced to achieve an optimum overall efficiency. Persons skilled in the art may wish to consult site-specific minimum design ambient freezing temperatures published by the National Oceanographic and Seismic Association—that is, the solution will be designed to have a freeze point at least as low as the site-specific minimum design freezing temperature. The cooling solution formulation will, in addition, desirably have a viscosity in a low range of solutions meeting such freeze point criteria. The alkali metal formate solution will desirably include a corrosion inhibitor.

Our invention also includes a method of enhancing the power output and efficiency of a gas turbine having an air inlet comprising regulating the temperature of the air in the air inlet to a temperature calculated to provide a desired air density, the regulation of air temperature brought about at least partially by a heat exchange fluid comprising an alkali metal formate, preferably potassium formate.

DETAILED DESCRIPTION OF THE INVENTION

Aqueous solutions of potassium and other alkali metal formate have lower freeze points and lower viscosities than comparable (having equal concentrations) ethylene or propylene glycol heat exchange fluids, and, unlike the glycols, have no notably harmful environmental effects. Aqueous potassium formate solutions are not flammable, are non-toxic to humans and other species, and are biodegradable, having a very low Biochemical Oxygen Demand (BOD), which reduces the risk of fish kills compared with ethylene or propylene glycol solutions.

An aqueous solution of 27 percent by weight potassium formate has a density of 10.04 pounds per gallon (1.205 SG); its coefficient of expansion is $2.25 \times 10^{-4}$, and a freeze point of about $-10°$ F. Other characteristics of a 27% potassium formate solution are as follows:

Thermal conductivity, expressed as $BTU/(hrs \cdot ft^2)(° F./ft)$:

| Temp (° F.) | 7 | 32 | 73.4 | 141.8 | 165.2 | | | | | |
|---|---|---|---|---|---|---|---|---|---|---|
| | .252 | .259 | .273 | .299 | .308 | | | | | |

Specific Heat, $(BTU/lb \cdot ° F.)$

| Temp (° F.) | 1.4 | 14 | 32 | 50 | 68 | 86 | 104 | 122 | 140 | 158 | 176 |
|---|---|---|---|---|---|---|---|---|---|---|---|
| | .717 | .722 | .728 | .733 | .739 | .743 | .749 | .752 | .755 | .758 | .761 |
| Temp (° F.) | −5 | 0 | 10 | 20 | 30 | 45 | 70 | 133 | 197 | | |
| Viscos, cp | 6.01 | 5.00 | 3.96 | 3.35 | 2.81 | 2.21 | 1.78 | 0.905 | 0.618 | | |

A comparison of the physical properties of solutions of Potassium formate to ethylene glycol and propylene glycol is shown in Table 1.

TABLE 1

| Fluid | Condition | 50 wt % Ethylene Glycol (1) | 50 Wt % Propylene Glycol (2 | 27 Wt % Potassium Formate |
|---|---|---|---|---|
| Freeze Point Deg F. | | −29 | −28 | −10 |
| Heat Capacity (BTU/lb F.) | @20 F. | 0.759 | 0.820 | 0.724 |
| | @120 F. | 0.811 | 0.871 | 0.752 |
| Viscosity (Cp) | @20 F. | 10.85 | 27.83 | 3.35 |
| | @120 F. | 1.82 | 2.36 | 1.01 |
| Thermal Conductivity (BTU/hr-ft-F-ft) | @20 F. | 0.207 | 0.199 | 0.255 |
| | @120 F. | 0.230 | 0.217 | |
| Regulatory Classification | | Toxic Chemical (S) Hazardous Air Pollutants (C) | Hazardous Air Pollutants (C) | None |
| Oral Toxicity Human (mg/kg) | | 786 ml | Not applicable | Not applicable |
| Bio-degradation-% degraded in 28 days | | >40% | >40% | 96% |
| 5 Day Biochemical Oxygen Demand (mg $O_2$/g product | | 780 | 1120 | 91 (3) |
| Theoretical Oxygen Demand (mg $O_2$/g product) | | 1290 | 1680 | 95 (3) |

(S) SARA Title III (USEPA)
(C) = USEPA Clean Air Act Amendment
1 Dow Chemical Co. "Engineering and Operating Guide- Dowtherm"
2 Dow Chemical Co. "Engineering and Operating Guide-"Dowfrost"
3 SGS Laboratories, NJ.

EXAMPLE 1

A gas turbine inlet air thrust augmentation cooling system was used to demonstrate the invention. Heat exchange fluids were compared in the same heat exchange system, a GE PG-7241(FA) gas under ambient air conditions of 96° F. Dry Bulb, 78° F. Wet Bulb, and sea level elevation. The Indirect heat exchangers had the following characteristics: total cross section of 1798 square foot face area, fin pitch of 1.5"×1.75" triangular, (96) 0.011" thick flat plate aluminum fins, 0.625" nominal diameter 0.024" thick copper tubes, and 4 fluid pass circuitry. The exchanger performance was calculated based on an Industrial Heat Transfer, Inc. proprietary sizing program ("Techdat 1") but the performance estimated is similar to other coil manufacturers programs and believed to be representative of the results, which would be obtained with other similar coil sizing programs from other manufacturers. Using a constant 36° F. entering fluid temperature and 8000 GPM total fluid flowrate, different heat exchange fluids in the same heat exchanger will cool the gas turbine inlet air stream to different temperatures and the gas turbine will achieve different power outputs. As shown in Table 2, in the case of the ethylene glycol circulating stream, the air to the gas turbine is cooled to 49.7 F and the turbine produces a maximum of 174,350 Kw power with a heat rate of 9324 BTU/kWh LHV (lower heating value). In the case of the propylene glycol circulating stream, the air to the gas turbine is cooled to 55.2 F and the turbine produces a maximum of 171,630 Kw power with a heat rate of 9361 BTU/kW LHV. With the preferred Potassium formate circulating stream, the air to the gas turbine is cooled to 45.5 F and the turbine produces a maximum of 176,330 Kw power with a heat rate of 9305 BTU/kWh LHV. In addition, additional efficiency savings will be realized in the refrigeration system supplying the chilled 36 F circulating stream because the heat transfer exchanger in this system will be more thermally efficient with reduced approach temperature for a given heat transfer surface with the Potassium formate working fluid. Chiller power consumption may be reduced, and the capacity of this system is increased by the use of the potassium formate heat exchange fluid.

TABLE 2

| Fluid | 50% Ethylene Glycol | 50% Propylene Glycol | 38% Potassium Formate |
|---|---|---|---|
| Entering Fluid Temperature (F.) | 36 | 36 | 36 |
| Leaving Fluid Temperature (F.) | 58.3 | 53.4 | 58.4 |
| Air to Gas Turbine (F.) | 49.7 | 55.2 | 45.5 |
| Total Fluid Flowrate (GPM) | 8000 | 8000 | 8000 |
| Fluid Pressure Drop thru Coil (PSI) | 37 | 44 | 27.8 |
| Turbine Power Output (Kw) | 174,350 | 171,630 | 176,330 |
| Turb. Heat Rate BTU/kWh LHV | 9324 | 9361 | 9305 | shown at −20° F., 0° F., and 8° F., the alkali metal formates at all levels of concentrations have significantly lower viscosities and accordingly are not only more efficiently circulated, but provide superior heat exchange because of their comparitively turbulent contate with the heat exchange surface.

TABLE 3

|  | 30% Potassium Formate | 45% Ethylene glycol | 21% potassium formate | 35% ethylene glycol | 22% sodium formate | 30% propylene glycol |
|---|---|---|---|---|---|---|
| Freeze point | −20° F. | −20° F. | 0° F. | 0° F. | 8° F. | 8° F. |
| Viscosity at |  |  |  |  |  |  |
| 20° F. | 3.6Cp | 9.75 | 3.1 | 6.75 | 5.8 | 15.5 |
| 30° F. | 2.9 | 6.9 | 2.6 | 4.95 | 4.5 | 7.1 |
| 40° F. | 2.6 | 5.9 | 2.3 | 4.1 | 3.8 | 5.7 |
| 50° F. | 2.3 | 4.8 | 2 | 3.5 | 3.1 | 4.5 |
| 60° F. | 2 | 4.1 | 1.7 | 3.1 | 2.6 | 3.6 |

It is clear from the above that the heat exchange properties and viscosities of alkali metal formate solutions at low temperatures enable one to regulate the temperature of the intake air to achieve a high degree of power generation efficiency. One may also use the same fluid to heat the air inhibiting the formation of ice on the heat exchange coils. Thus, it may be said that our invention is a method of regulating the power output and efficiency of a gas turbine having an air inlet comprising selecting a desired temperature range for air in the air inlet to achieve an air density to provide a range of power output and efficiency for the gas turbine and regulating the temperature of air in the air inlet to a temperature within the desired temperature range with a heat exchange fluid comprising alkali metal formate. Preferably, the heat exchange fluid is an aqueous solution 5–70% by weight potassium formate, which may include 1–60% by weight of a glycol having up to six carbon atoms. In another aspect, our invention comprises a method of enhancing the power output and efficiency of a gas turbine having a heat exchanger for intake air, the heat exchanger including a heat exchange fluid and a heat exchange surface in contact with the intake air and the heat exchange fluid, comprising (a) determining a desired air temperature range for the intake air taking into account the ambient density of the air, (b) determining a desired viscosity range for the heat exchange fluid in the heat exchanger to efficiently achieve the desired air temperature range, (c) using as the heat exchange fluid an aqueous solution comprising an alkali metal formate, the aqueous alkali metal formate solution having a viscosity within said desired viscosity range. In another aspect, our invention includes a method of inhibiting ice formation on the heat exchange surfaces of an air intake for a combustion turbine, wherein the ambient air temperature of air approaching said air intake is below 43° F., and wherein said heat exchange surfaces are contacted by a heat exchange fluid, comprising utilizing as said heat exchange fluid an aqueous solution comprising potassium formate or sodium formate. A similar solution may be used when the ambient air temperature is less than 32° F., 20° F., or 0° F. In each case, a solution comprising potassium formate, preferably between 5% and 70% by weight, is preferred.

What is claimed is:

1. A method of enhancing the efficiency of a gas turbine having an air inlet, comprising:

selecting a desired temperature range for air in said air inlet to achieve an air density to provide a range of efficiency for said gas turbine; and regulating the temperature of said air in said air inlet to a temperature within said temperature range with a heat exchange fluid comprising a formate compound at a concentration in a range from about 15 weight percent to about 70 weight percent.

2. The method of claim 1 wherein said heat exchange fluid comprises sodium formate in water.

3. The method of claim 1 wherein said heat exchange fluid comprises potassium formate in water.

4. The method of claim 1, wherein the concentration is at least 21 weight percent.

5. The method of claim 1, wherein the concentration is at least 30 weight percent.

6. The method of claim 1, wherein the concentration is in a range from about 21 weight percent to about 38 weight percent.

7. A method of regulating the efficiency of a gas turbine having a heat exchanger for intake air, said heat exchanger including a heat exchange fluid and a heat exchange surface in contact with said intake air and said heat exchange fluid, comprising:

(a) determining a desired air temperature range for said intake air taking into account the ambient density of said air;

(b) determining a desired viscosity range for said heat exchange fluid in said heat exchanger to efficiently achieve said desired air temperature range; and (c) using as said heat exchange fluid an aqueous formate solution having a viscosity within said desired viscosity range and further comprising a formate concentration in a range from about 15 weight percent to about 70 weight percent.

8. The method of claim 7, including determining a desired temperature range for said heat exchange fluid and maintaining said heat exchange fluid temperature within said desired temperature range.

9. Method of claim 7 wherein said heat exchange fluid includes at least 5% by weight of a glycol.

10. Method of claim 7 wherein said viscosity range is lower than 5 Cps.

11. The method of claim 7, wherein the formate concentration is at least 21 weight percent.

12. The method of claim 7, wherein the formate concentration is at least 30 weight percent.

13. The method of claim 7, wherein the formate concentration is in a range from about 21 weight percent to about 38 weight percent.

14. A method of inhibiting ice formation on the heat exchange surfaces of an air intake for a combustion turbine, wherein the ambient air temperature of air approaching said air intake is below about 43° F., and wherein said heat exchange surfaces are contacted by a heat exchange fluid, comprising:

contacting the heat exchange surfaces with an aqueous formate solution having a viscosity at about −20° F. of less than about 5 Cps, a freeze point of less than about 0° F., and a formate concentration in a range from about 15 weight percent to about 70 weight percent.

15. The method of claim 14, wherein said formate solution comprises potassium formate.

16. The method of claim 14, wherein said ambient air temperature is below about 32° F.

17. The method of claim 14, wherein said ambient air temperature is below about 0° F.

18. The method of claim 14, wherein the concentration is at least 21 weight percent.

19. The method of claim 14, wherein the concentration is in a range from about 21 weight percent to about 38 weight percent.

* * * * *